(12) United States Patent
Ikarashi et al.

(10) Patent No.: US 10,083,314 B2
(45) Date of Patent: Sep. 25, 2018

(54) SECRET PARALLEL PROCESSING DEVICE, SECRET PARALLEL PROCESSING METHOD, AND PROGRAM

(71) Applicant: NIPPON TELEGRAPH AND TELEPHONE CORPORATION, Chiyoda-ku (JP)

(72) Inventors: Dai Ikarashi, Musashino (JP); Ryo Kikuchi, Musashino (JP); Koki Hamada, Musashino (JP); Koji Chida, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 187 days.

(21) Appl. No.: 15/025,486

(22) PCT Filed: Oct. 3, 2014

(86) PCT No.: PCT/JP2014/076531
§ 371 (c)(1),
(2) Date: Mar. 28, 2016

(87) PCT Pub. No.: WO2015/053184
PCT Pub. Date: Apr. 16, 2015

(65) Prior Publication Data
US 2016/0210472 A1    Jul. 21, 2016

(30) Foreign Application Priority Data
Oct. 10, 2013   (JP) ................................. 2013-213026

(51) Int. Cl.
*G06F 21/62*   (2013.01)
*G09C 1/00*    (2006.01)
(Continued)

(52) U.S. Cl.
CPC .......... *G06F 21/6218* (2013.01); *G06F 21/64* (2013.01); *G09C 1/00* (2013.01);
(Continued)

(58) Field of Classification Search
CPC ....... H04L 9/0838; H04L 9/06; H04L 9/0875; H04L 9/32; H04L 9/085; H04K 1/00;
(Continued)

(56) References Cited

U.S. PATENT DOCUMENTS 4,991,107 A *   2/1991  Sloane .................. G01M 7/022
                                                  700/280
5,703,952 A *  12/1997  Taylor .................. H04L 9/0668
                                                    380/43
(Continued)

OTHER PUBLICATIONS

Extended European Search Report dated May 11, 2017 in European Patent Application No. 14852876.3.
(Continued)

*Primary Examiner* — Thanhnga B Truong
(74) *Attorney, Agent, or Firm* — Oblon, McClelland, Maier & Neustadt, L.L.P.

(57) ABSTRACT

A secret parallel processing device reducing communication amount includes: a randomization unit that obtains a non-randomized input sequence and outputs a randomized sequence obtained by joining the non-randomized sequence and a dummy record sequence formed of a disclosed value and subjecting the joined sequences to random replacement processing and concealed random replacement data obtained by concealing used random replacement data; a calculation unit that obtains the non-randomized sequence, the randomized sequence, and the dummy record sequence, applies a predetermined function to the sequences, and generates an output checksum for each sequence by using calculation procedure data used in the processing of applying the function; and a correctness verification unit that obtains the
(Continued)

output checksum for each sequence and the concealed random replacement data, assesses the output checksum for each sequence, and outputs a final test result determining whether the predetermined function has been correctly applied on the non-randomized sequence.

9 Claims, 8 Drawing Sheets

(51) Int. Cl.
H04L 9/08 (2006.01)
G06F 21/64 (2013.01)
(52) U.S. Cl.
CPC .......... *H04L 9/085* (2013.01); *H04L 2209/08* (2013.01); *H04L 2209/46* (2013.01)
(58) Field of Classification Search
CPC ........ H04W 12/04; G01R 31/28; G01M 7/00; G01M 7/02; G06F 7/72; G06F 7/60; G06F 21/62; G06F 21/64; G06F 21/6218; G06K 19/073; G07F 7/10; G09C 1/00
USPC .......... 380/46, 28, 44, 268, 43, 47; 714/738, 714/733; 700/664, 280; 708/491; 713/174; 707/999.3, 999.1, E17.108, 707/E17.115; 73/664; 726/30
See application file for complete search history.

(56) References Cited

U.S. PATENT DOCUMENTS

| | | | |
|---|---|---|---|
| 6,408,075 B1 * | 6/2002 | Ohki | G06F 7/72 380/268 |
| 6,862,594 B1 * | 3/2005 | Saulpaugh | G06F 9/465 |
| 7,062,696 B2 * | 6/2006 | Barry | G01R 31/31813 714/733 |
| 9,787,475 B2 * | 10/2017 | Minematsu | H04L 9/3242 |

OTHER PUBLICATIONS

Dai Ikarashi, et al., "An Efficient SIMD Protocol against Malicious Adversaries for Secure Computation Schemes Based on (k,n) Secret Sharing Schemes with Small Party Sets", Computer Security Symposium, pp. 793-800, (Oct. 21- 23, 2013) (with English Abstract).
Dai Ikarashi, et al., "An Extremely Efficient Secret-sharing-based Multi-Party Computation against Malicious Adversary", The 30th Synposium on Cryptography and Information Security, pp. 1-8, (Jan. 22-25, 2013) (With English Translation).
Sven Laur, et al., "Round-Efficient Oblivious Database Manipulation", Lecture Notes in Computer Science, vol. 7001, pp. 262-277, (2011).
Koki Hamada, et al., "A Random Permutation Protocol on Three-Party Secure Function Evaluation", Information Processing Society of Japan Symposium Series, vol. 2010, No. 9, pp. 561-566, (Oct. 12, 2010) (with English Abstract).
International Search Report dated Nov. 4, 2014 in PCT/JP14/076531 Filed Oct. 3, 2014.
Communication Pursuant to Article 94(3) EPC dated May 11, 2018 in European Patent Application No. 14 852 876.3.

* cited by examiner

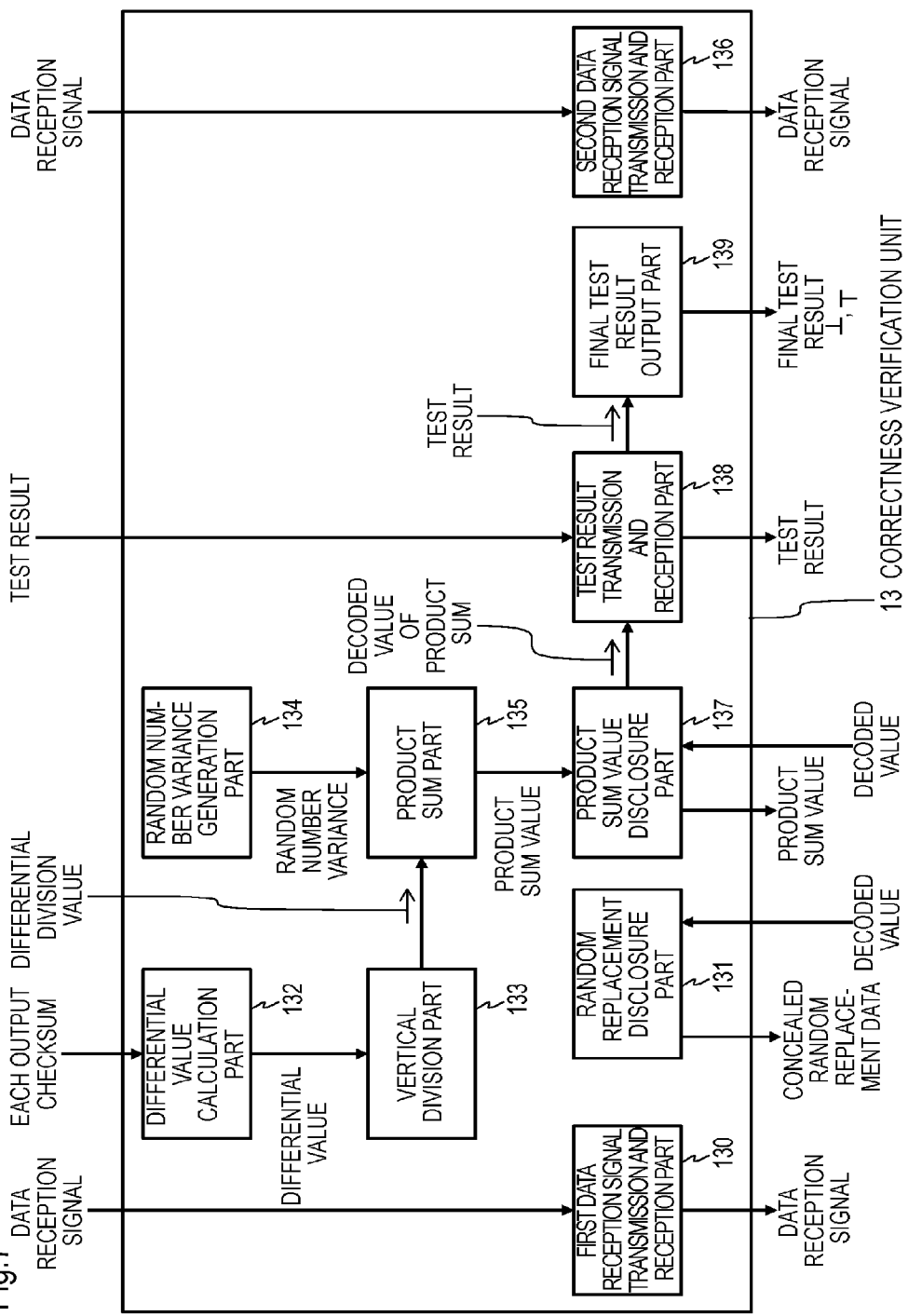

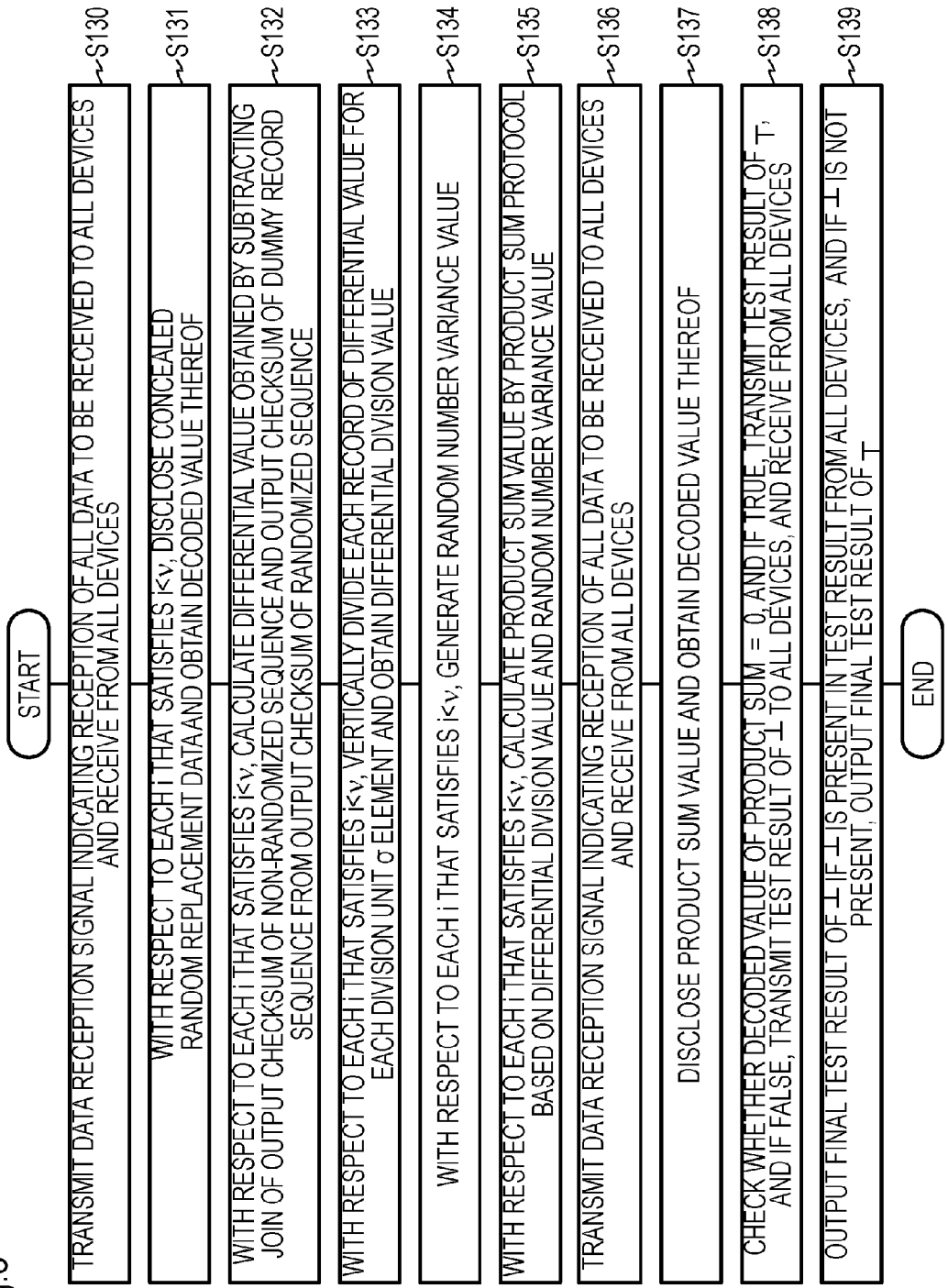

SECRET PARALLEL PROCESSING DEVICE, SECRET PARALLEL PROCESSING METHOD, AND PROGRAM

TECHNICAL FIELD

The present invention relates to a secret parallel processing device, a secret parallel processing method, and a program for performing data processing while maintaining correctness of a calculation result and concealing data by secret sharing.

BACKGROUND ART

As a conventional secret calculation method maintaining correctness, a technique is disclosed in Non-patent Literature 1, for example.

PRIOR ART LITERATURE

Non-Patent Literature

Non-patent Literature 1: Dai Ikarashi, Koki Hamada, Ryo Kikuchi, Koji Chida: "An Extremely Efficient Secret-sharing-based Multi-Party Computation against Malicious Adversary", SCIS 2013 (Symposium on Cryptography and Information Security), Cryptographic Protocol Session (3C3-2)

SUMMARY OF THE INVENTION

Problems to be Solved by the Invention

In the conventional technique described above, there has been a problem that the communication cost is high with the security parameter of κ (that is, the alteration success rate of around $½^κ$) and the amount of communication with the parameter C representing the scale of the processing of O (κC) bits. In view of such a problem, an object of the present invention is to provide a secret parallel processing device capable of reducing the amount of communication which occurs in secret parallel processing.

Means to Solve the Problems

A secret parallel processing device according to the present invention includes a randomization unit, a calculation unit, and a correctness verification unit.

The randomization unit obtains a non-randomized sequence which is an input sequence and outputs a randomized sequence obtained by joining the non-randomized sequence and a dummy record sequence formed of a disclosed value and subjecting the joined sequences to random replacement processing and concealed random replacement data obtained by concealing used random replacement data. The calculation unit obtains the non-randomized sequence, the randomized sequence, and the dummy record sequence, applies a predetermined function to the obtained sequences, and generates an output checksum for each sequence by using calculation procedure data used in the processing of applying the function. The correctness verification unit obtains the output checksum for each sequence and the concealed random replacement data, assesses the output checksum for each sequence, and outputs a final test result determining whether the predetermined function has been correctly applied on the non-randomized sequence.

Effects of the Invention

A secret parallel processing device according to the present invention can reduce the amount of communication which occurs in secret parallel processing.

BRIEF DESCRIPTION OF THE DRAWINGS

FIG. 7 is block diagram illustrating the configuration of a correctness verification unit in the secret parallel processing device according to the first embodiment.

FIG. 8 is a flowchart illustrating an operation performed by the correctness verification unit in the secret parallel processing device according to the first embodiment.

DETAILED DESCRIPTION OF THE EMBODIMENT

Figure 1:
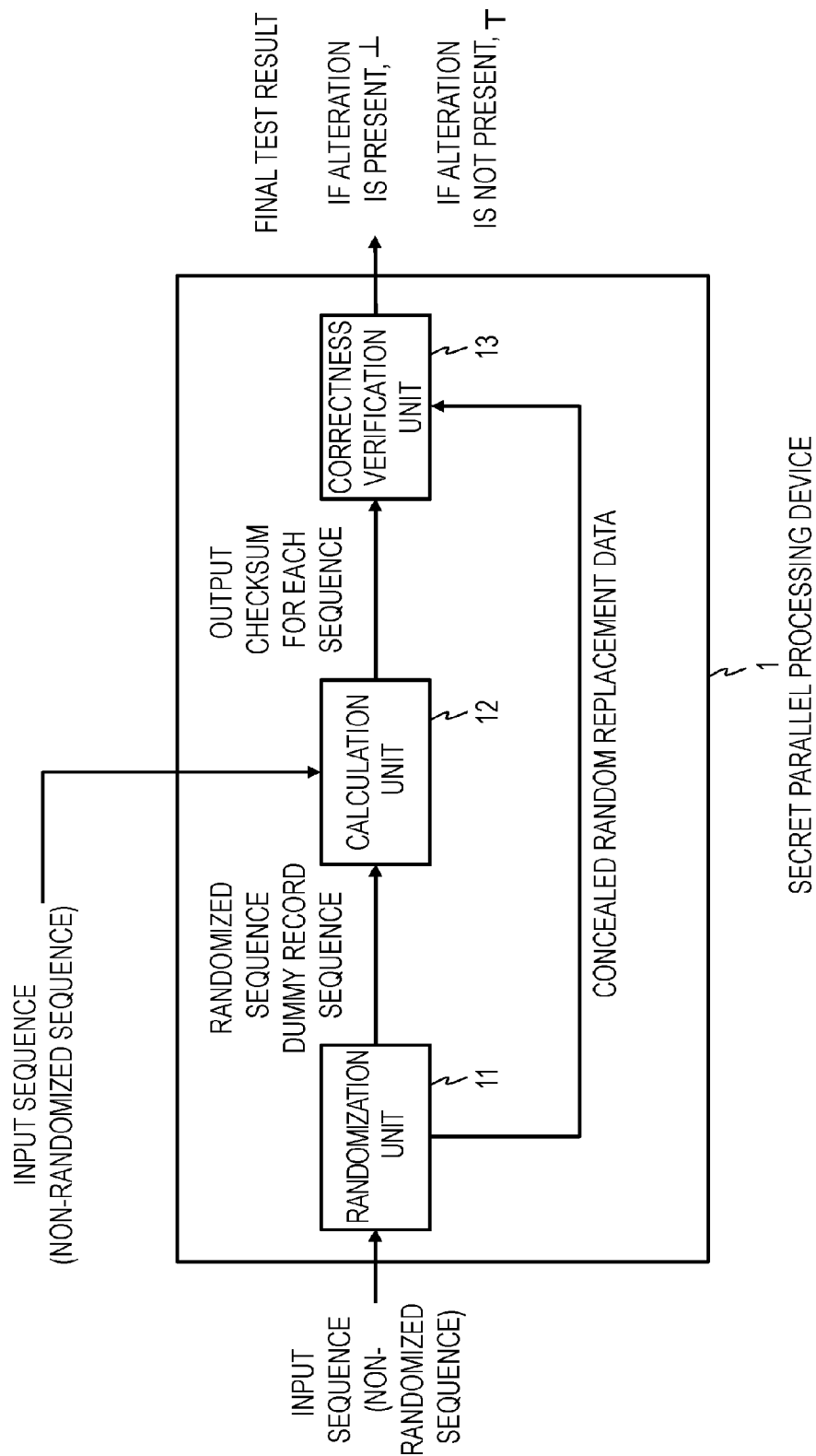
FIG. 1 is a block diagram illustrating the configuration of a secret parallel processing device according to a first embodiment.

An embodiment of the present invention will be described in detail below. Components having the same function will be denoted with the same reference numerals and their descriptions will not be repeated.

[First Embodiment]

<Notation>

Notations commonly used herein will be described below.

A plaintext space is R.

With respect to a function $f:R \to R'$, $f^N:R^N \to R'^N$ is parallel execution of f, that is, $f^N(a_0, \ldots, a_{N-1}) = (f(a_0), \ldots, f(a_{N-1}))$.

With respect to a ring R, $O_R$ is a zero element of R.

X is an optional collection, and m and m' are optional integers. With respect to an element x of $X^m$, i is an optional integer and the i-th element is denoted as $x_i$.

With respect to $x \in X^m$, $y \in X^{m'}$, a join $(x_0, \ldots, x_{m-1}, y_0, \ldots, y_{m'-1}) \in X^{m+m'}$ is denoted as $x \| y$.

With respect to $x \in (X^m)^N$, $y \in (X^{m'})^N$, a vertical join $(x_0 \| y_0, \ldots, x_{N-1} \| y_{N-1})$ is denoted as $x \|_v y$.

[x] is a value obtained by concealing a value x by secret sharing, and with respect to a collection X, [X] is a collection of values obtained by concealing an element of X.

<Outline of Secret Parallel Processing Device>

The outline of a secret parallel processing device according to the present embodiment will be described below with reference to FIG. 1. FIG. 1 is a block diagram illustrating the configuration of a secret parallel processing device 1 according to the present embodiment. As illustrated in FIG. 1, the secret parallel processing device 1 according to the present embodiment includes a randomization unit 11, a calculation unit 12, and a correctness verification unit 13. The randomization unit 11 and the calculation unit 12 receive an input of an input sequence (referred to as a non-randomized sequence). The correctness verification unit 13 outputs a final test result. A plurality of secret parallel processing devices 1 form a group and the group performs processing described below to execute secret parallel processing.

<Outline of Secret Parallel Processing Method>

Figure 2:
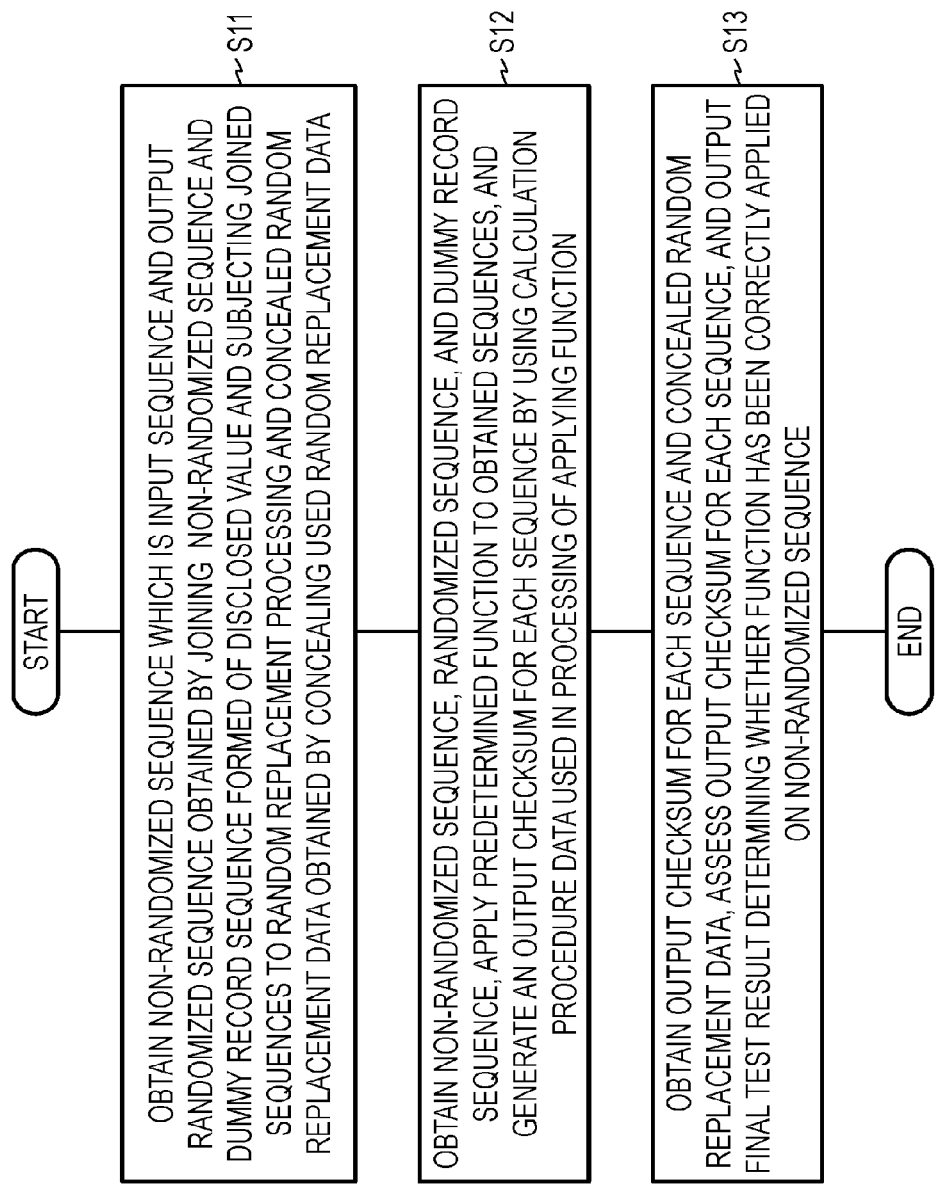
FIG. 2 is a flowchart illustrating an operation performed by the secret parallel processing device according to a first embodiment.

The outline of a secret parallel processing method according to the present embodiment will be described below with reference to FIG. 2. FIG. 2 is a flowchart illustrating an operation performed by the secret parallel processing device 1 according to the present embodiment. As illustrated in FIG. 2, the secret parallel processing method according to the present embodiment is separated into three steps of a randomization step (step S11, scheme 1), a calculation step (step S12, scheme 2), and a correctness verification step (step S13, scheme 3) and the three steps are performed sequentially. The randomization unit 11 performs the randomization step, the calculation unit 12 performs the calculation step, and the correctness verification unit 13 performs the correctness verification step.

The randomization unit 11 obtains the non-randomized sequence which is an input sequence and outputs a randomized sequence obtained by joining the non-randomized sequence and a dummy record sequence formed of a disclosed value and subjecting the joined sequences to random replacement processing and concealed random replacement data obtained by concealing used random replacement data (S11). It should be noted that a disclosed value is a value disclosed to all devices in the group. The replacement data is a sequence of N elements in which each element is a number different from one another from 0 to N−1, for example, and represents a replacement method of data of the N elements. For example, to replace data of N=3 (a_0, a_1, a_2) with replacement data (2, 1, 0), a_0 is moved to the second, a 1 is moved to the first, and a 2 is moved to the zeroth to obtain (a_2, a_1, a_0). Random replacement data generated from a random number is referred to as random replacement data. The concealed random replacement data is, with the method disclosed in Reference Non-patent Literature 2 for example, a collection of $_nC_k$ pieces of random replacement data shared by each of sets of k devices in the group ($_nC_k$ types are present when it is assumed that the number of devices in the group is n). When replacement is performed, all of these pieces of replacement data are used to perform replacement sequentially. With the concealed random replacement data as described above, each of sets of n-k devices has at least one unshared piece of random replacement data, whereby the overall replacement is concealed.

The calculation unit 12 obtains the non-randomized sequence, the randomized sequence, and the dummy record sequence, applies a predetermined function to the obtained sequences, and generates an output checksum for each sequence by using calculation procedure data used in the processing of applying the function (S12). The correctness verification unit 13 obtains the output checksum for each sequence and the concealed random replacement data, assesses the output checksum for each sequence, and outputs a final test result determining whether the predetermined function has been correctly applied on the non-randomized sequence (S13).

<Randomization Unit 11>

Figure 3:
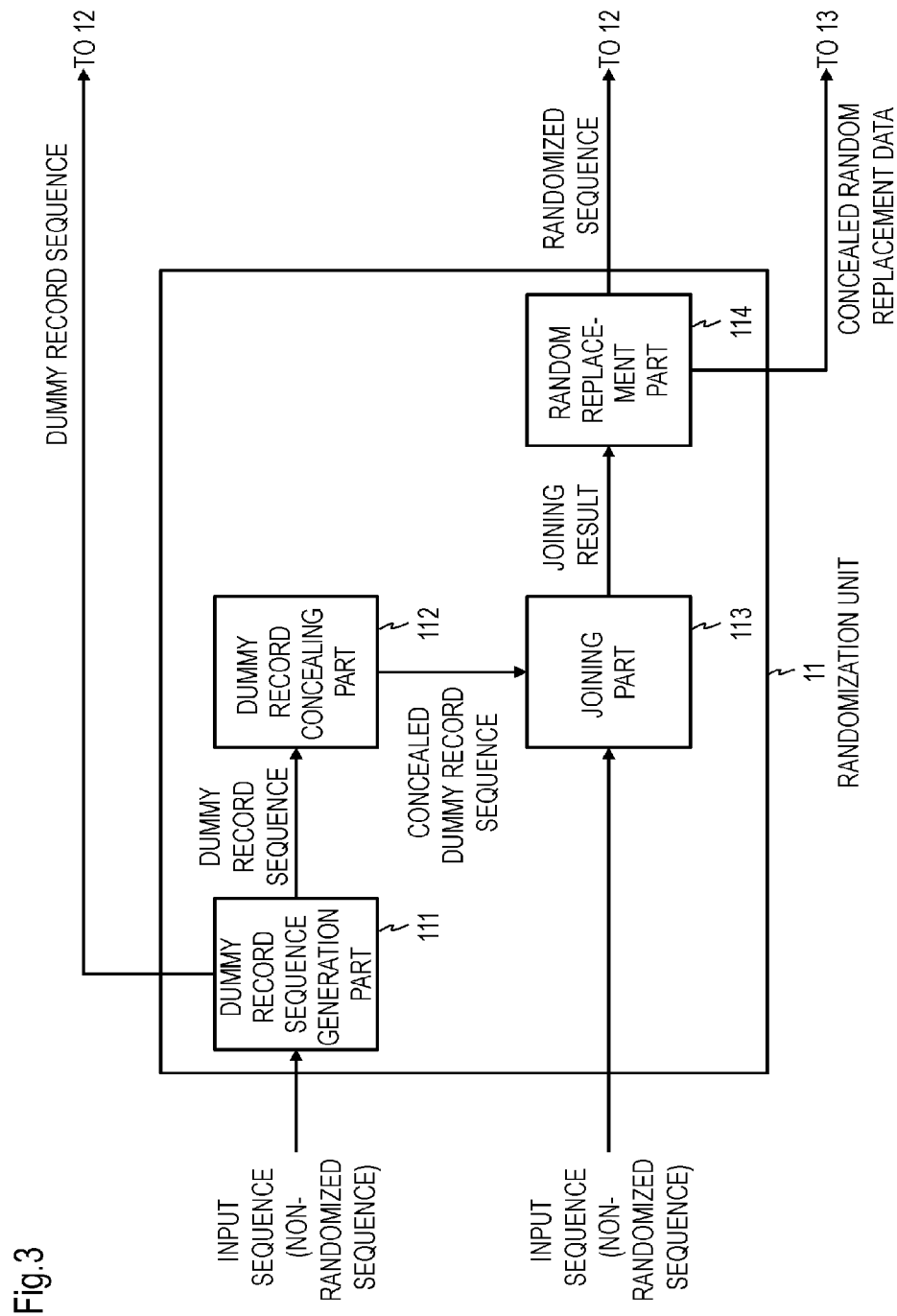
FIG. 3 is a block diagram illustrating the configuration of a randomization unit in the secret parallel processing device according to the first embodiment.
Figure 4:
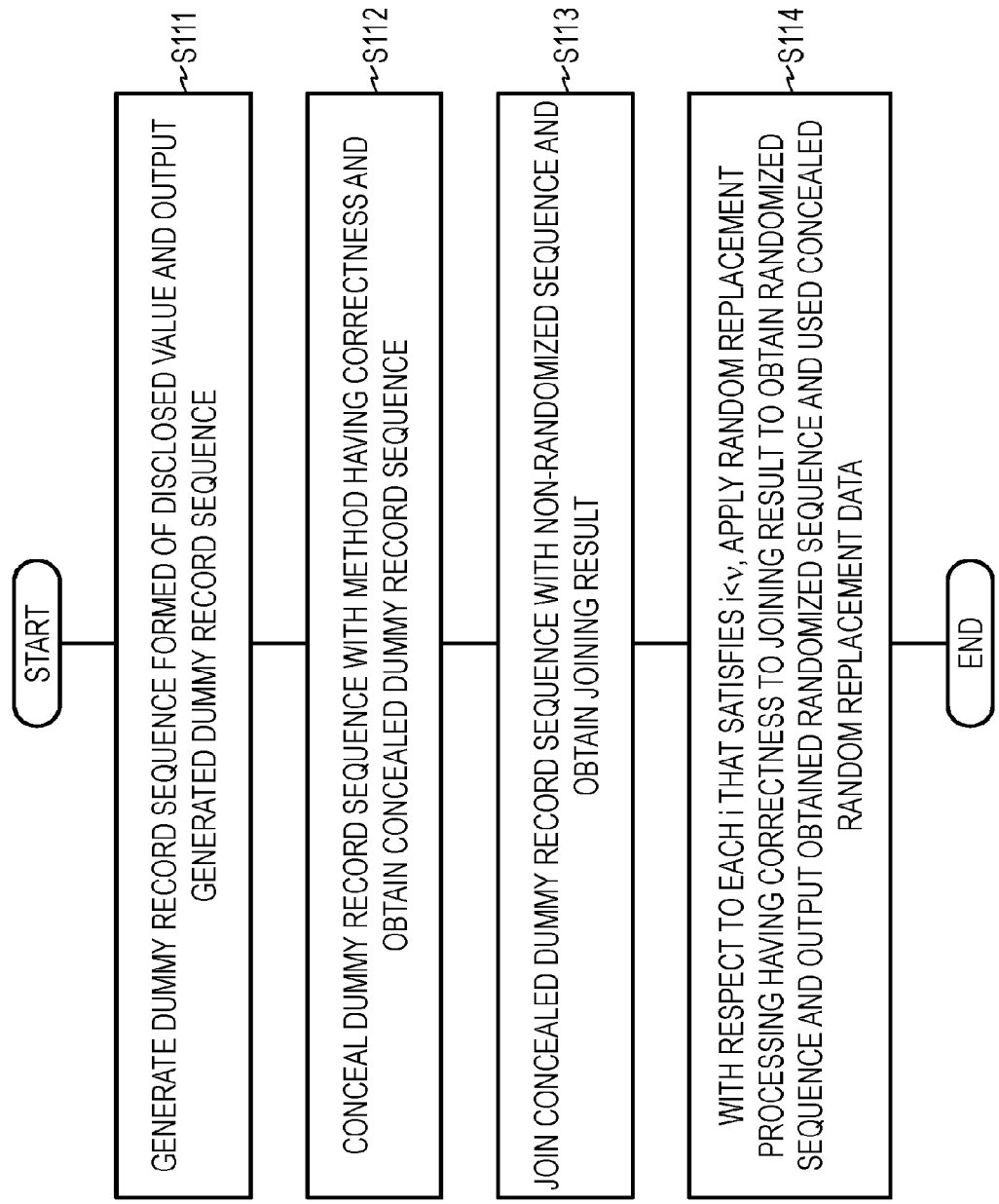
FIG. 4 is a flowchart illustrating an operation performed by the randomization unit in the secret parallel processing device according to the first embodiment.

The details of the randomization unit 11 and the randomization step (S11, scheme 1) performed by the randomization unit 11 will be described with reference to FIGS. 3 and 4. FIG. 3 is a block diagram illustrating the configuration of the randomization unit 11 in the secret parallel processing device 1 according to the present embodiment. FIG. 4 is a flowchart illustrating an operation performed by the randomization unit 11 in the secret parallel processing device 1 according to the present embodiment. As illustrated in FIG. 3, the randomization unit 11 includes a dummy record sequence generation part 111, a dummy record concealing part 112, a joining part 113, and a random replacement part 114.

In scheme 1, a dummy record sequence is added and random replacement processing having correctness is performed for ν times. The parameter ν is an integer set so as to substantially satisfy $\nu = \lceil \kappa / \log N_1 \rceil$. Sharing of the disclosed values is an off-line processing and each device in the group performing the secret parallel processing may generate a share of that device with a random number component fixed. It should be noted that the random replacement processing having correctness is optional. Examples of the random replacement processing includes random replacement processing having correctness disclosed in Reference Non-patent Literature 1, and random replacement processing in which random replacement processing not having correctness disclosed in Reference Non-patent Literature 1 or random replacement processing disclosed in Reference Non-patent Literature 2 is combined with a conversion method disclosed in Non-patent Literature 1 described above.

(Reference Non-patent Literature 1) S. Laur, J. Willemson, and B. Zhang. Round-efficient oblivious database manipulation. In X. Lai, J. Zhou, and H. Li eds., ISC, Vol. 7001 of Lecture Notes in Computer Science, pp. 262-277. Springer, 2011.

(Reference Non-patent Literature 2) Koki Hamada, Dai Ikarashi, Koji Chida, Katsumi Takahashi, "A Random Permutation Protocol on Three-Party Secure Function Evaluation", Information Processing Society of Japan Symposium Series, Oct. 12, 2010, Vol. 2010, No. 9, pp. 561-566

To conceal a disclosed value x into n pieces by secret sharing with correctness, each device in the group may perform processing described below. This can be applied to any kind of secret sharing.

1) Secret sharing normally generates random numbers. All these random numbers are set to constants such as 0.

2) With an input set to x and random numbers set to the above-described constants, secret sharing algorism is applied to obtain n shares.

3) Out of n shares, only the share for that device is output.

Because x is a disclosed value, the processing described above can be performed individually in each device without any communication in the group. It is well known that processing performed without communication has correctness as a secret calculation. The concealing process described above thus has correctness.

Parameters, inputs, and outputs used in scheme 1 will be presented below.

Parameter: m input μ output function F to be calculated (m and μ are set to the number of inputs and the number of outputs for the output function F to be calculated, respectively), the number of records N, the number of dummy records to be inserted |D|, the number of randomized sequences ν∈E (E is a collection of optional natural numbers)

Input: Non-randomized sequence $[A] \in ([R]^m)^N$

Output: Concealed random replacement data $[\pi_0], \ldots, [\pi_{\nu-1}] \in [\Pi^{N+|D|}]$ randomized sequence $[B_0] = [\pi_0](A \| D)], \ldots, [B_{\nu-1}] = [\pi_{\nu-1}(A \| D)] \in ([R]^\mu)^{N+|D|}$, dummy record sequence $D \in (R^m)^{|D|}$, however, Π represents a collection of concealed random replacement data.

<Step S111>

A dummy record sequence generation part 111 generates a dummy record sequence $D \in (R^m)^{|D|}$ formed of a disclosed value and outputs the generated dummy record sequence (S111). The content thereof is optional within the domain of $F^{|D|}$.

<Step S112>

The dummy record concealing part 112 conceals the dummy record sequence D with a method having correctness and obtains a concealed dummy record sequence $[D] \in ([R]^m)^{|D|}$ (S112).

<Step S113>

The joining part 113 joins the concealed dummy record sequence [D] with an input (non-randomized sequence [A]) and obtains a joining result $[A\|D] := [A]\|[D]$ (S113).

Step S114 described below is performed with respect to each i that satisfies i<v.

<Step S114>

The random replacement part 114 applies random replacement processing having correctness to the joining result $[A\|D]$ to obtain a randomized sequence $[B_i] := [\pi_i(A\|D)]$ and outputs the obtained randomized sequence and used concealed random replacement data $[\pi_i] \in [\Pi]$ (S114).

<Calculation unit 12>

Figure 5:
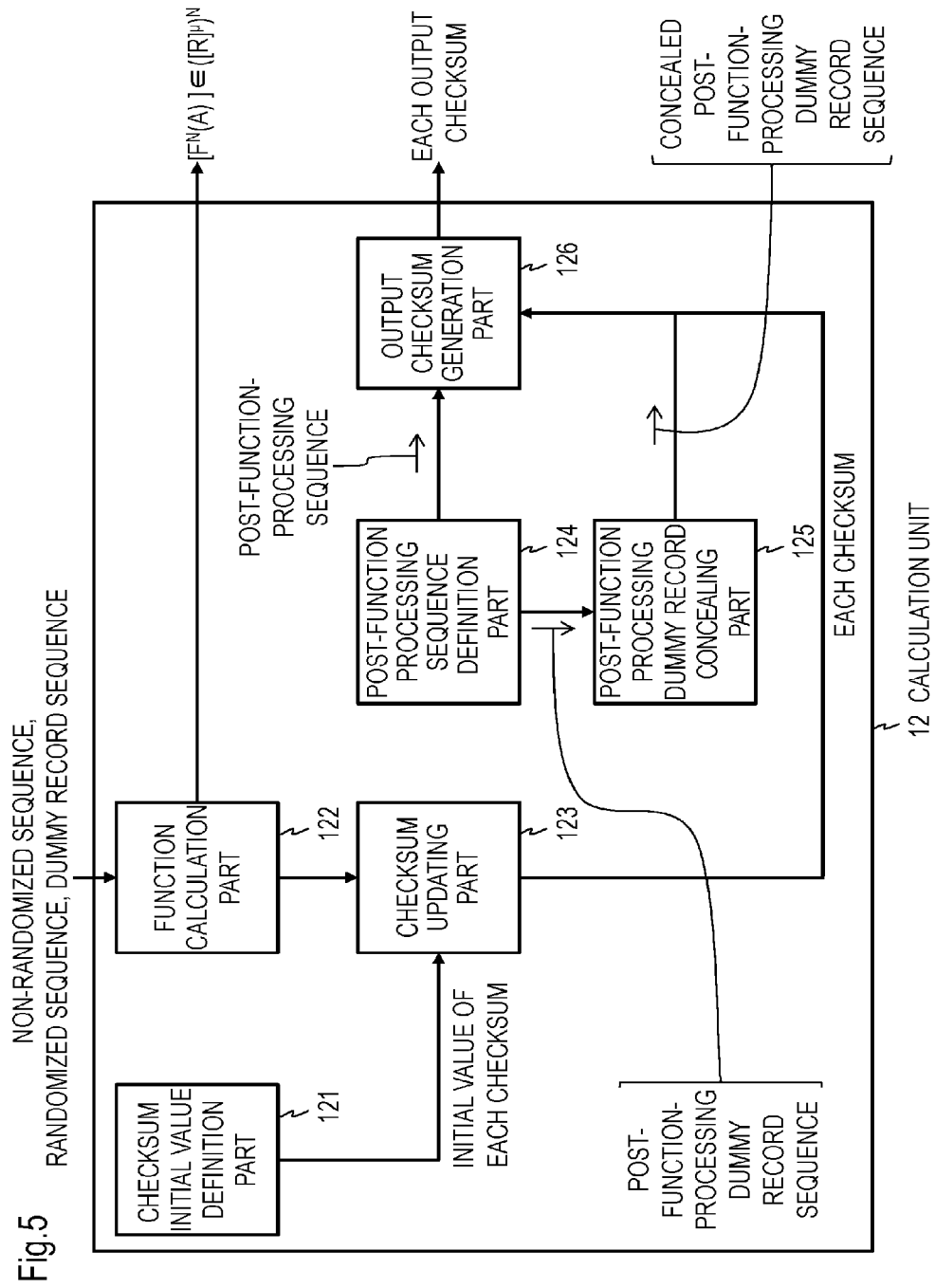
FIG. 5 is a block diagram illustrating the configuration of a calculation unit in the secret parallel processing device according to the first embodiment.
Figure 6:
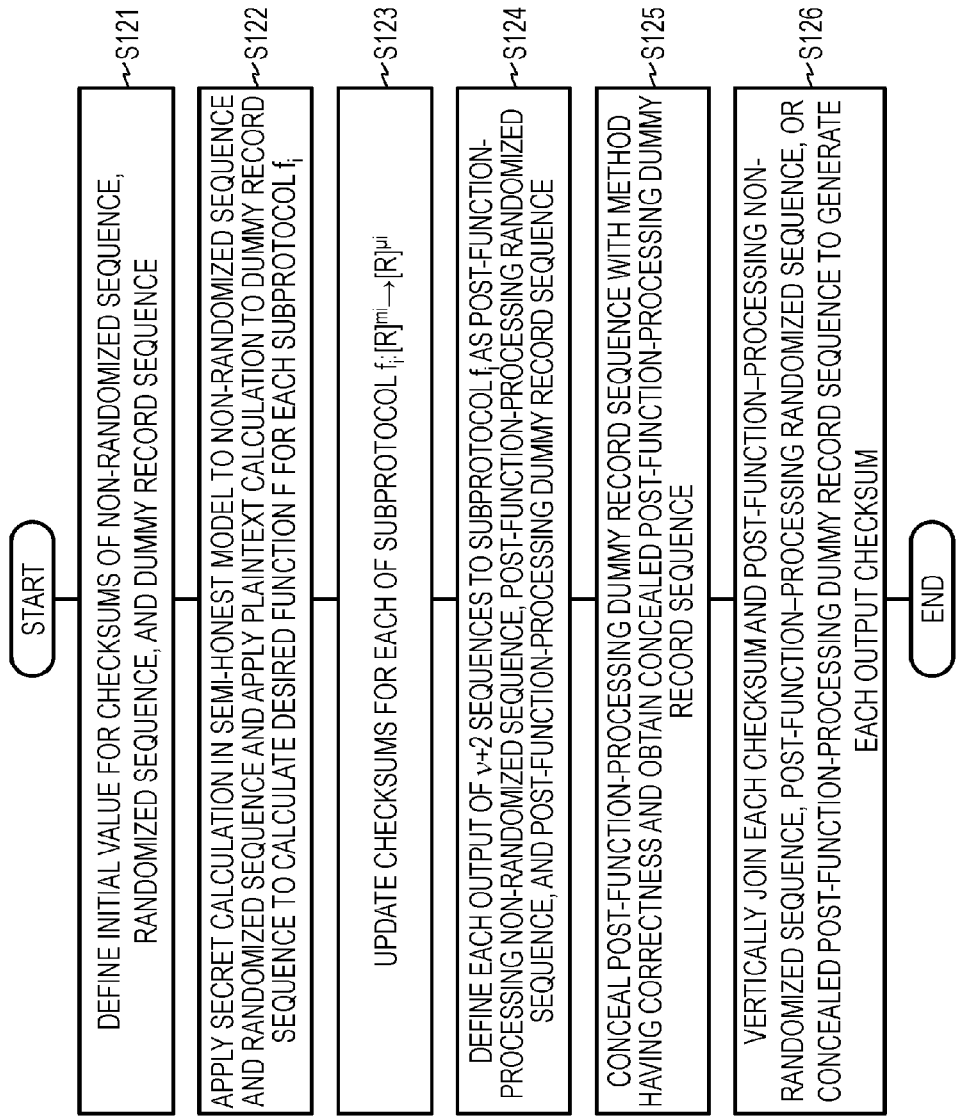
FIG. 6 is a flowchart illustrating an operation performed by the calculation unit in the secret parallel processing device according to the first embodiment.

The details of the calculation unit 12 and a calculation step (S12, scheme 2) performed by the calculation unit 12 will be described below with reference to FIGS. 5 and 6. FIG. 5 is a block diagram illustrating the configuration of the calculation unit 12 in the secret parallel processing device 1 according to the present embodiment. FIG. 6 is a flowchart illustrating an operation performed by the calculation unit 12 in the secret parallel processing device 1 according to the present embodiment. As illustrated in FIG. 5, the calculation unit 12 includes a checksum initial value definition part 121, a function calculation part 122, a checksum updating part 123, a post-function-processing sequence definition part 124, a post-function-processing dummy record concealing part 125, and an output checksum generation part 126.

In scheme 2, a desired function F is calculated in parallel with three types of sequences: non-randomized sequence, randomized sequence, and dummy record sequence. At this time, each output is stored as a checksum.

Parameters, inputs, and outputs used in scheme 2 will be presented below.

Parameter: m input µ output function F to be calculated, the number of records N, the number of dummy records to be inserted |D|, the number of randomized sequences $v \in E$ (E is a collection of optional natural numbers)

Input: Non-randomized sequence $[A] \in ([R]^m)^N$, randomized sequence $[B_0], \ldots, [B_{v-1}] \in ([R]^\mu)^{N+|D|}$, dummy record sequence $D \in (R^m)^{|D|}$ Output: Output $[F^N(A)] \in ([R]^\mu)^N$, v+2 checksums $[C_A]$, $[C_{B0}], \ldots, [C_{Bv-1}], [C_D]$ <Step S121>

The checksum initial value definition part 121 defines initial values for checksums of the non-randomized sequence, the randomized sequence, and the dummy record sequence as $[C_A]:=\vec{0} \in ([R]^0)^N$, $[C_{B0}]:=\vec{0} \in ([R]^0)^{N+|D|}, \ldots, [C_{Bv-1}]:=\vec{0} \in ([R]^0)^{N+|D|}$, $[C_D]:=\vec{0} \in ([R]^0)^{|D|}$, respectively (S121). However, $\vec{0}$ is an empty vector.

<Step S122>

The function calculation part 122 applies secret calculation in the semi-honest model to v+1 sequences of the non-randomized sequence [A] and the randomized sequence $[B_0], \ldots, [B_{v-1}]$ and applies plaintext calculation to the dummy record sequence D to calculate a desired function F for each of subprotocol $f_i:[R]^{m_i} \to [R]^{\mu_i}$, and outputs $[F^N(A)] \in ([R]^\mu)^N$ (S122). However, $m_i$ and $\mu_i$ are the number of inputs and the number of outputs of the subprotocol $f_i$, respectively.

<Step S123>

The checksum updating part 123 updates checksums for each of the subprotocol $f_i:[R]^{m_i} \to [R]^{\mu_i}$ described above (S123).

<Step S124>

The post-function-processing sequence definition part 124 defines each output of v+2 sequences to the subprotocol $f_i$ as post-function-processing non-randomized sequence $[A'] \in ([R]^{\mu_i})^N$, post-function-processing randomized sequence $[B'_0], \ldots, [B'_{v-1}] \in ([R]^{\mu_i})^{N+|D|}$, and post-function-processing dummy record sequence $D' \in (R^{\mu_i})^{|D|}$ (S124).

<Step S125>

The post-function-processing dummy record concealing part 125 conceals post-function-processing dummy record sequence D' with a method having correctness and obtains a concealed post-function-processing dummy record sequence [D'] (S125).

<Step S126>

The output checksum generation part 126 vertically joins checksums of non-randomized sequence $[C_A]$ and post-function-processing non-randomized sequence $[A']$ to generate output checksums of the non-randomized sequence $([C_A]:=[C_A]\|v[A'])$, and outputs the generated checksums (S126). The output checksum generation part 126, with respect to each i that satisfies i<v, vertically joins checksums of randomized sequence $[C_{Bi}]$ and post-function-processing randomized sequence $[B'_i]$ to generate output checksums of randomized sequence $([C_{Bi}]:=[C_{Bi}]\|v[B'_i])$, and outputs the generated output checksums (S126). The output checksum generation part 126 vertically joins checksums of the dummy record sequence $[C_D]$ and the concealed post-function-processing dummy record sequence $[D']$ to generate output checksums of dummy record sequence $([C_D]:=[C_D]\|v[D'])$, and outputs the generated output checksums (S126).

<Correctness Verification Unit 13>

The details of the correctness verification unit 13 and a correctness verification step (S13, scheme 3) performed by the correctness verification unit 13 will be described below with reference to FIGS. 7 and 8. FIG. 7 is block diagram illustrating the configuration of the correctness verification unit 13 in the secret parallel processing device 1 according to the present embodiment. FIG. 8 is a flowchart illustrating an operation performed by the correctness verification unit 13 in the secret parallel processing device 1 according to the present embodiment. As illustrated in FIG. 7, the correctness verification unit 13 includes a first data reception signal transmission and reception part 130, a random replacement disclosure part 131, a differential value calculation part 132, a vertical division part 133, a random number variance generation part 134, a product sum part 135, a second data reception signal transmission and reception part 136, a product sum value disclosure part 137, a test result transmission and reception part 138, and a final test result output part 139.

In scheme 3, correctness is verified based on the checksums stored in the calculation step. A sign SYNC represents processing in which a signal is transmitted that notifies receipt of all data to be received by that time point to all the other devices in the group and the corresponding signal from all the other devices in the group is received. Until the SYNC is confirmed, subsequent processing is not performed, whereby security within an asynchronous network is secured.

Parameters, inputs, and outputs used in scheme 3 will be presented below.

Parameter: m input µ output function F to be calculated, the number of records N, the number of dummy records to be inserted |D|, the number of randomized sequences v∈E (E is a collection of optional natural numbers), division unit σ∈E Input: Output checksum $[C_A]$, $[C_{B0}]$, ..., $[C_{Bv-1}]$, $[C_D]$, concealed random replacement data $[\pi_0]$, ..., $[\pi_{v-1}] \in [\Pi^{N+|D|}]$ Output: If any alteration has been made, final test result indicating that the alteration has been made ⊥, if no alteration has been made, final test result indicating that no alteration has been made ⊤

<Step S130>

The first data reception signal transmission and reception part 130 performs SYNC processing described above (S130). More specifically, the first data reception signal transmission and reception part 130 transmits a data reception signal that is a signal notifying receipt of all data to be received by step S130 to all the other devices in the group and receives the corresponding signal from all the other devices in the group (S130).

Step S131 to step S135 described below are performed with respect to each i that satisfies i<v.

<Step S131>

The random replacement disclosure part 131 discloses the concealed random replacement data $[\pi_i]$ and obtains a decoded value thereof $\pi_i$ (S131).

<Step S132>

The differential value calculation part 132 calculates a differential value $[\zeta_i]$ obtained by subtracting the join of the output checksum of the non-randomized sequence $[C_A]$ and the output checksum of the dummy record sequence $[C_D]$ ($[C_A]\|[C_D]$) from the output checksum of the randomized sequence $[C_{Bi}]$(S132). That is, the differential value calculation part 132 calculates a differential value $[\zeta_i]:=[C_{Bi}]-([C_A]\|[C_D]) \in ([R]^M)^{N+|D|}$ (S132). It should be noted that M is the number of elements per one record of $[C_A]$(or $[C_{Bi}]$, equal in both cases).

<Step S133>

The vertical division part 133 vertically divides each record of the differential value $[\zeta_i]$ for each division unit a element (S133). The vertical division part 133 obtains $M'=\lceil M/\sigma \rceil$ pieces of elements of $([R]\sigma)^{N+|D|}$. When a fraction is generated at the last division, the vertical division part 133 pads a part less than the σ element with zero. The vertical division part 133 obtains a differential division value $[\zeta'_i] \in [R]^\sigma)^{(N+|D|)M'}$ (S133).

<Step S134>

The random number variance generation part 134 generates a variance value of a random number $[\rho_i] \in ([R]^\sigma)^{(N+|D|)M'}$ (S134).

<Step S135>

The product sum part 135 calculates a product sum value $$[\phi] = \sum_{i<v} [\rho_i][\zeta'_i]$$

by a product sum protocol based on a differential variance value and the variance value of the random number (S135).

<Step S136>

The second data reception signal transmission and reception part 136 performs SYNC processing (S136). More specifically, the second data reception signal transmission and reception part 136 transmits a data reception signal that is a signal notifying receipt of all data to be received by step S136 to all the other devices in the group and receives the corresponding signal from all the other devices in the group (S136).

<Step S137>

The product sum value disclosure part 137 discloses the product sum value $[\phi]$ and obtains a decoded value thereof φ (S137).

<Step S138>

The test result transmission and reception part 138 checks whether the decoded value of the product sum value φ=0, and if true, transmits a test result of ⊤, and if false, transmits a test result of ⊥ to all the other devices in the group. The test result transmission and reception part 138 also receives the test results from all the other devices in the group (S138).

<Step S139>

The final test result output part 139 outputs a final test result of ⊥ if ⊥ is present in the test results from all the other devices in the group, and if ⊥ is not present, outputs a final test result of ⊤ (S139).

The secret parallel processing device 1 according to the present embodiment can reduce the amount of communication in secret parallel processing. More specifically, the secret parallel processing device 1 can achieve the amount of communication of O (⌈κ/logN⌉C) bits when performing calculation of parallel data counts N, whereby the amount of communication is improved from a conventional method by logN.

<Point of the Present Invention>

Conventionally, to ensure correctness of a processing result, the property of a field which is an algebraic structure has been used. However, with this policy, the security parameter κ is approximately the same as the bit length of the field. According to the present invention, random replacement processing is used to add the parallel data counts N to the security strength. It should be noted that although a dummy record can have any contents, security cannot be achieved without a dummy record.

Various types of processing described above can be performed in time series in accordance with the descriptions as well as performed in parallel or individually in accordance with the capacity or the need of the device performing the processing. Needless to say, modifications also can be added as appropriate within the scope of the present invention.

When the configuration described above is implemented on a computer, the contents of processing function to be contained in each device is written by a program. With this program executed on the computer, the above-described processing function is executed on the computer.

This program with the contents of processing written thereinto can be stored in a computer-readable recording medium. The computer-readable recording medium may be any medium such as a magnetic recording device, an optical disc, a magneto-optical medium, and a semiconductor memory.

Distribution of this program is implemented by sales, transfer, rental, and other transactions of a portable recording medium such as a DVD and CD-ROM with the program recorded thereon, for example. Furthermore, this program may be stored in a storage unit of a server computer and transferred from the server computer to other computers via a network so as to be distributed.

A computer that executes a program as described above first stores the program stored in a portable recording medium or transferred from a server computer in a storage unit of the computer, for example. When the processing is performed, the computer reads out the program stored in the recording medium of the computer and performs processing in accordance with the program thus read out. As another execution form of this program, the computer may directly read out the program from a portable recording medium and perform processing in accordance with the program. Furthermore, each time the program is transferred to the computer from the server computer, the computer may perform processing in accordance with the received program. Alternatively, what is called application service provider (ASP) type of services may be used to perform the processing described above, with which the program is not transferred from the server computer to the computer and the processing function is realized only with execution instructions and result acquisition. It should be noted that a program according to the present embodiment includes information provided for processing performed by an electronic calculation equipment, which is equivalent to a program (such as data that is not a direct instruction to the computer but has a property stipulating the processing performed by the computer).

In the present embodiment, the present device is configured with a predetermined program executed on a computer. However, the present device may be configured with at least part of these processing contents realized in a hardware manner.

What is claimed is:

1. A secret parallel processing device among a plurality of secret parallel processing devices, comprising:
    processing circuitry configured to
        receive an input of a disclosed value that is shared among the plurality of secret parallel processing devices, where all of the secret parallel processing devices receive the disclosed value,
        obtain a non-randomized sequence being an input sequence and output a randomized sequence obtained by joining the non-randomized sequence and a dummy record sequence formed of the disclosed value and subjecting the joined sequences to random replacement processing and concealed random replacement data obtained by concealing used random replacement data;
        obtain the non-randomized sequence, the randomized sequence, and the dummy record sequence, apply a predetermined function to the obtained sequences, and generate an output checksum for each sequence by using calculation procedure data used in the processing of applying the function; and
        obtain the output checksum for each sequence and the concealed random replacement data, assess the output checksum for each sequence, and output a test result determining whether the predetermined function has been correctly applied on the non-randomized sequence,
    wherein the processing circuitry transmits the test result to all the other secret parallel processing devices, and receives test results from all the other secret parallel processing devices included in the group indicating whether a respective predetermined function has been correctly applied in each of the other secret parallel processing devices, and the processing circuitry outputs a final test result that indicates that no alteration has occurred only when the respective predetermined function has been correctly applied in all the secret parallel processing devices.

2. The secret parallel processing device according to claim 1, wherein
    a plaintext space is R,
    with respect to a function $f:R \to R'$, $f^N:R^N \to R'^N$ is parallel execution of f, that is, $f^N(a_0, \ldots, a_{N-1}) = (f(a_0), \ldots, f(a_{N-1}))$,
    with respect to a ring R, $O_R$ is a zero element of R,
    X is an optional collection,
    m and m' are optional integers,
    i is an optional integer,
    with respect to an element x of $X^m$, the i-th element is denoted as $x_i$,
    with respect to $x \in X^m$, $y \in X^{m'}$, a join $(x_0, \ldots, x_{m-1}, y_0, \ldots, y_{m'-1}) \in X^{m+m'}$ is denoted as $x \| y$,
    with respect to $x \in (X^m)^N$, $y \in (X^{m'})^N$, a vertical join $(x_0 \| y_0, \ldots, x_{N-1} \| y_{N-1})$ is denoted as $x \|_v y$,
    [x] is a value obtained by concealing a value x by secret sharing,
    with respect to a collection X, [X] is a collection of values obtained by concealing an element of X,
    m and μ are the number of inputs and the number of outputs for an output function F to be calculated, respectively,
    the number of records is N, the number of dummy records to be inserted is |D|, and the number of randomized sequences is $v \in E$,
    Π represents a collection of random replacement data after secret sharing, and
    the processing circuitry is further configured to
        generate a dummy record sequence $D \in (R^m)^{|D|}$ formed of the disclosed value and output the generated dummy record sequence,
        conceal the dummy record sequence D with a method having correctness and obtains a concealed dummy record sequence $[D] \in ([R]^m)^{|D|}$,
        join the concealed dummy record sequence [D] with the non-randomized sequence [A] and obtain a joining result $[A\|D] := [A] \| [D]$, and
    apply random replacement processing having correctness to the joining result $[A\|D]$ to obtain the randomized sequence $[B_i] := [\pi_i(A\|D)]$ and output the obtained randomized sequence and used concealed random replacement data $[\pi_i] \in [\Pi]$ with respect to each i that satisfies $i < v$.

3. The secret parallel processing device according to claim 2, wherein
    $\vec{0}$ represents an empty vector, and
    the processing circuitry is further configured to
        define initial values for checksums of the non-randomized sequence, the randomized sequence, and the dummy record sequence as $[C_A] := \vec{0} \in ([R]^0)^N$, $[C_{B0}] := \vec{0} \in ([R]^0)^{N+|D|}, \ldots, [C_{Bv-1}] := \vec{0} \in ([R]^0)^{N+|D|}$, $[C_D] := \vec{0} \in ([R]^0)^{|D|}$, respectively,
        set $m_i$ and $\mu_i$ to the number of inputs and the number of outputs of subprotocol $f_i$, respectively, and apply secret calculation in the semi-honest model to v+1 sequences of the non-randomized sequence [A] and the randomized sequence $[B_0], \ldots, [B_{v-1}]$ and apply plaintext calculation to the dummy record sequence D to calculate a desired function F for each of subprotocol $f_{i,[R]}{}^{m_i} \to [R]^{\mu_i}$,
        update checksums for each of the subprotocol $f_i : [R]^{m_i} \to [R]^{\mu_i}$,
        define each output of v+2 sequences to the subprotocol $f_i$ as post-function-processing non-randomized sequence $[A'] \in ([R]^{\mu_i})^N$, post-function-processing randomized sequence [B'$_0$], . . . , [B'$_{v-1}$]∈ ([R]$^{\mu i}$)$^{N+|D|}$, and post-function-processing dummy record sequence D'∈(R$^{\mu i}$)$^{|D|}$, conceal post-function-processing dummy record sequence D' with a method having correctness and obtain a concealed post-function-processing dummy record sequence [D'], and output output checksums of the non-randomized sequence [C$_A$]:=[C$_A$]∥$_v$[A'], output checksums of the randomized sequence [C$_{Bi}$]:=[C$_{Bi}$]∥$_v$[B'$_i$] with respect to each i that satisfies i<v, and output checksums of the dummy record sequence [C$_D$]:=[C$_D$]∥$_v$ [D'].

4. The secret parallel processing device according to claim 3, wherein the processing circuitry is further configured to transmit a data reception signal that is a signal notifying receipt of all data to be received to all the other secret parallel processing devices included in a group and receives the corresponding signal from all the other secret parallel processing devices included in the group, disclose the concealed random replacement data [π$_i$] and obtains a decoded value thereof π$_i$ with respect to each i that satisfies i<v, set M to the number of elements per one record of the output checksum of the non-randomized sequence [C$_A$] or the output checksum of the randomized sequence [C$_{Bi}$] and calculate a differential value [ζ$_i$]:=[C$_{Bi}$]−([C$_A$]∥[C$_D$])∈([R]$^M$)$^{N+|D|}$ with respect to each i that satisfies i<v, vertically divide each record of the differential value [ζ$_i$] for each division unit σ element and obtain a differential division value [ζ'$_i$]∈([R]$^\sigma$)$^{(N+|D|)M'}$ with respect to each i that satisfies i<v, generate a variance value of a random number [ρ$_i$]∈ ([R]$^\sigma$)$^{(N+|D|)M'}$ with respect to each i that satisfies i<v, calculate a product sum value $$[\phi] = \sum_{i<v} [\rho_i][\zeta'_i]$$

by a product sum protocol, transmit a data reception signal that is a signal notifying receipt of all data to be received to all the other secret parallel processing devices included in the group and receives the corresponding signal from all the other secret parallel processing devices included in the group, disclose the product sum value [φ] and obtains a decoded value thereof φ, check whether the decoded value of the product sum value φ=0, and if true, transmit a test result of ⊤, and if false, transmit a test result of ⊥ to all the other secret parallel processing devices included in the group and receive the test results ⊤ or ⊥ from all the other secret parallel processing devices included in the group, and output a final test result of ⊥ if ⊥ is present in the test results from all the other secret parallel processing devices included in the group, and if ⊥ is not present, outputs a final test result of ⊤.

5. A secret parallel processing method, implemented by a secret parallel processing device among a plurality of secret parallel processing devices, comprising:

receiving an input of a disclosed value that is shared among the plurality of secret parallel processing devices, where all of the secret parallel processing devices receive the disclosed value, a randomization step of obtaining a non-randomized sequence being an input sequence and outputting a randomized sequence obtained by joining the non-randomized sequence and a dummy record sequence formed of the disclosed value and subjecting the joined sequences to random replacement processing and concealed random replacement data obtained by concealing used random replacement data;

a calculation step of obtaining the non-randomized sequence, the randomized sequence, and the dummy record sequence, applying a predetermined function to the obtained sequences, and generating an output checksum for each sequence by using calculation procedure data used in the processing of applying the function; and a correctness verification step of obtaining the output checksum for each sequence and the concealed random replacement data, assessing the output checksum for each sequence, and outputting a test result determining whether the predetermined function has been correctly applied on the non-randomized sequence, wherein the method includes transmitting the test result to all the other secret parallel processing devices, and receiving test results from all the other secret parallel processing devices included in the group indicating whether a respective predetermined function has been correctly applied in each of the other secret parallel processing devices, and outputting a final test result that indicates that no alteration has occurred only when the respective predetermined function has been correctly applied in all the secret parallel processing devices.

6. The secret parallel processing method according to claim 5, wherein a plaintext space is R, with respect to a function f:R→R', f$^N$:R$^N$→R'$^N$ is parallel execution of f, that is, f$^N$(a$_0$, . . . , a$_{N-1}$)=(f(a$_0$), . . . , f(a$_{N-1}$)), with respect to a ring R, O$_R$ is a zero element of R, X is an optional collection, m and m' are optional integers, i is an optional integer, with respect to an element x of X$^m$, the i-th element is denoted as x$_i$, with respect to x∈X$^m$, y∈X$^{m'}$, a join (x$_0$, . . . , x$_{m-1}$, y$_0$, . . . , Y$_{m'-1}$)∈X$^{m+m'}$ is denoted as x∥y, with respect to x∈(X$^m$)$^N$, y∈(X$^{m'}$)$^N$, a vertical join (x$_0$∥y$_0$, . . . , x$_{N-1}$∥y$_{N-1}$) is denoted as x∥vy,

[x] is a value obtained by concealing a value x by secret sharing, with respect to a collection X, [X] is a collection of values obtained by concealing an element of X, m and μ are the number of inputs and the number of outputs for an output function F to be calculated, respectively, the number of records is N, the number of dummy records to be inserted is |D|, and the number of randomized sequences is v∈E, Π represents a collection of random replacement data after secret sharing, and the randomization step further includes
- a dummy record sequence generation step of generating a dummy record sequence $D \in (R^m)^{|D|}$ formed of the disclosed value and outputting the generated dummy record sequence,
- a dummy record concealing step of concealing the dummy record sequence D with a method having correctness and obtaining a concealed dummy record sequence $[D] \in ([R]^m)^{|D|}$,
- a joining step of joining the concealed dummy record sequence [D] with the non-randomized sequence [A] and obtaining a joining result $[A\|D]:=[A]\|[D]$, and
- a random replacement step of applying random replacement processing having correctness to the joining result $[A\|D]$ to obtain the randomized sequence $[B_i]:=[\pi_i(A\|D)]$ and outputting the obtained randomized sequence and used concealed random replacement data $[\pi_i] \in [\Pi]$ with respect to each i that satisfies i<v.

7. The secret parallel processing method according to claim 6, wherein
$0^{\rightarrow}$ represents an empty vector, and
the calculation step further includes
- a checksum initial value definition step of defining initial values for checksums of the non-randomized sequence, the randomized sequence, and the dummy record sequence as $[C_A]:=0^{\rightarrow} \in ([R]^0)^N$, $[C_{B0}]:=0^{\rightarrow} \in ([R]^0)^{N+|D|}$, ..., $[C_{Bv-1}]:=0^{\rightarrow} \in ([R]^0)^{N+|D|}$, $[C_D]:=0^{\rightarrow} \in ([R]^0)^{|D|}$, respectively,
- a function calculation step of setting $m_i$ and $\mu_i$ to the number of inputs and the number of outputs of subprotocol $f_i$, respectively, and applying secret calculation in the semi-honest model to v+1 sequences of the non-randomized sequence [A] and the randomized sequence $[B_0], \ldots, [B_{v-1}]$ and applying plaintext calculation to the dummy record sequence D to calculate a desired function F for each of subprotocol $f_i:[R]^{mi} \to [R]^{\mu i}$,
- a checksum updating step of updating checksums for each of the subprotocol $f_i[R]^{mi} \to [R]^{\mu i}$,
- a post-function-processing sequence definition step of defining each output of v+2 sequences to the subprotocol $f_i$ as post-function-processing non-randomized sequence $[A'] \in ([R]^{\mu i})^N$, post-function-processing randomized sequence $[B'_0], \ldots, [B'_{v-1}] \in ([R]^{\mu i})^{N+|D|}$, and post-function-processing dummy record sequence $D' \in (R^{\mu i})^{|D|}$,
- a post-function-processing dummy record concealing step of concealing post-function-processing dummy record sequence D' with a method having correctness and obtaining a concealed post-function-processing dummy record sequence [D'], and
- an output checksum generation step of outputting output checksums of the non-randomized sequence $[C_A]:=[C_A]\|_v[A']$, output checksums of the randomized sequence $[C_{Bi}]:=[C_{Bi}]\|_v[B'_i]$ with respect to each i that satisfies i<v, and output checksums of the dummy record sequence $[C_D]:=[C_D]\|_v[D']$.

8. The secret parallel processing method according to claim 7, wherein
the correctness verification step further includes
- a first data reception signal transmission and reception step of transmitting a data reception signal that is a signal notifying receipt of all data to be received to all the other secret parallel processing devices included in a group and receiving the corresponding signal from all the other secret parallel processing devices included in the group,
- a random replacement disclosure step of disclosing the concealed random replacement data $[\pi_i]$ and obtaining a decoded value thereof $\pi_i$ with respect to each i that satisfies i<v,
- a differential value calculation step of setting M to the number of elements per one record of the output checksum of the non-randomized sequence $[C_A]$ or the output checksum of the randomized sequence $[C_{Bi}]$ and calculating a differential value $[\zeta_i]:=[C_{Bi}] - ([C_A]\|[C_{D]) \in ([R]}^M)^{N+|D|}$ with respect to each i that satisfies i<v,
- a vertical division step of vertically dividing each record of the differential value $[\zeta_i]$ for each division unit σ element and obtaining a differential division value $[\zeta'_i] \in ([R]^\sigma)^{(N|D|)M'}$ with respect to each i that satisfies i<v,
- a random number variance generation step of generating a variance value of a random number $[\rho_i] \in ([R]^\sigma)^{(N+|D|)M'}$ with respect to each i that satisfies i<v,
- a product sum step of calculating a product sum value $$[\phi] = \sum_{i<v} [\rho_i][\zeta'_i]$$

by a product sum protocol,
- a second data reception signal transmission and reception step of transmitting a data reception signal that is a signal notifying receipt of all data to be received to all the other secret parallel processing devices included in the group and receiving the corresponding signal from all the other secret parallel processing devices included in the group,
- a product sum value disclosure step of disclosing the product sum value $[\varphi]$ and obtaining a decoded value thereof $\varphi$,
- a test result transmission and reception step of checking whether the decoded value of the product sum value $\varphi=0$, and if true, transmitting a test result of $\top$, and if false, transmitting a test result of $\bot$ to all the other secret parallel processing devices included in the group and receiving the test results $\top$ or $\bot$ from all the other secret parallel processing devices included in the group, and
- a final test result output step of outputting a final test result of $\bot$ if $\bot$ is present in the test results from all the other secret parallel processing devices included in the group, and if $\bot$ is not present, outputting a final test result of $\top$.

9. A non-transitory computer readable medium storing a computer program for causing a computer to function as the secret parallel processing device according to claim 1.

* * * * *

UNITED STATES PATENT AND TRADEMARK OFFICE
CERTIFICATE OF CORRECTION

PATENT NO. : 10,083,314 B2
APPLICATION NO. : 15/025486
DATED : September 25, 2018
INVENTOR(S) : Dai Ikarashi et al.

Page 1 of 1

It is certified that error appears in the above-identified patent and that said Letters Patent is hereby corrected as shown below:

In the Claims

Column 10, Line 62, please change the equation from "$f_{i:[R]}{}^{mi} \to [R]^{\mu i}$" to --$f_i:[R]^{mi} \to [R]^{\mu i}$--;

Column 12, Line 52, please change the equation from "$(x_0, \ldots, x_{m-1}, y_0, \ldots, Y_{m'-1}) \in X^{m+m'}$" to --$(x_0, \ldots, x_{m-1}, y_0, \ldots, y_{m'-1}) \in X^{m+m'}$--; and Column 14, Line 17, please change the equation from "$([C_A]||[C_D]) \in ([R]^M)^{N+|D|}$" to --$([C_A]||[C_D]) \in ([R]^M)^{N+|D|}$--.

Signed and Sealed this
Eleventh Day of June, 2019

Andrei Iancu
*Director of the United States Patent and Trademark Office*